(12) United States Patent
Yin

(10) Patent No.: US 12,493,142 B2
(45) Date of Patent: Dec. 9, 2025

(54) OPTICAL FILM AND DISPLAY

(71) Applicants: Huizhou China Star Optoelectronics Display Co., Ltd., Guangdong (CN); TCL China Star Optoelectronics Technology Co., Ltd., Guangdong (CN)

(72) Inventor: Hongshan Yin, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 732 days.

(21) Appl. No.: 17/876,844

(22) Filed: Jul. 29, 2022

(65) Prior Publication Data
US 2024/0019612 A1 Jan. 18, 2024

(30) Foreign Application Priority Data

Jul. 14, 2022 (CN) .......................... 202210833419.X

(51) Int. Cl.
*G02B 5/02* (2006.01)
(52) U.S. Cl.
CPC ......... *G02B 5/0231* (2013.01); *G02B 5/0278* (2013.01); *G02B 5/0294* (2013.01)
(58) Field of Classification Search
None
See application file for complete search history.

(56) References Cited

U.S. PATENT DOCUMENTS

| 2007/0086086 | A1* | 4/2007 | Cassarly | G02B 6/0053 |
| | | | | 359/362 |
| 2008/0247191 | A1* | 10/2008 | Hsu | G02B 3/0056 |
| | | | | 385/36 |
| 2010/0302479 | A1 | 12/2010 | Aronson et al. | |

(Continued)

FOREIGN PATENT DOCUMENTS

| CN | 110178059 | 8/2019 |
| CN | 113156695 | 7/2021 |

(Continued)

OTHER PUBLICATIONS

Notification of Office Action and Search Report Dated Apr. 29, 2023 From The State Intellectual Property Office of the People's Republic of China Re. Application No. 202210833419.X and Its Translation Into English. (30 Pages).

*Primary Examiner* — Derek S. Chapel

(57) ABSTRACT

An optical film and a display are provided and including a substrate and microstructures. The microstructures are disposed on the substrate, wherein the microstructure includes first line segment portions and second line segment portions, and wherein in an extension direction of the microstructure, the first line segment portions and the second line segment portions are alternately arranged and connected to each other, and an extending direction of the first line segment portions intersects with an extending direction of the second line segment portions. The present application utilizes the microstructures disposed on the substrate to change the optical path of part of the light of the display screen, thereby weakening the phenomenon of light and dark stripes and moiré patterns caused by the periodic microstructures of the display screen.

19 Claims, 5 Drawing Sheets

(56) References Cited

U.S. PATENT DOCUMENTS

2019/0196063 A1\* 6/2019 Gui .................... G02F 1/133502
2019/0212607 A1\* 7/2019 Tien ..................... G02B 5/0236
2020/0379159 A1\* 12/2020 Li ........................ G02B 6/0053

FOREIGN PATENT DOCUMENTS

| CN | 114415267 | 4/2022 |
|----|-----------|--------|
| JP | 2011-059529 | 3/2011 |
| WO | WO 2022/099622 | 5/2022 |

\* cited by examiner

OPTICAL FILM AND DISPLAY

RELATED APPLICATION

This application claims the benefit of priority of Chinese Patent Application No. 202210833419.X filed on Jul. 14, 2022, the contents of which are incorporated by reference as if fully set forth herein in their entirety.

FIELD OF INVENTION

The present application relates to a field of display technology, and particularly relates to an optical film and a display.

BACKGROUND OF INVENTION

With the advancement of social economy and technology, users have different visual needs for shared information and confidential information. The conventional display mode can no longer meet the needs of the users. Currently, wide viewing angle and narrow viewing angle display screens have become an important development direction in the display field.

Technical Problem

In the process of researching and practicing the prior art, the inventor of the present application has discovered that in the current technical means, the viewing angles are mainly increased or decreased by adding periodic microstructures to a display screen. However, due to the existence of the periodic microstructures, it is easy to cause interference and diffraction of light, resulting in bright and dark stripes or moiré patterns on display, which affects display quality.

SUMMARY OF INVENTION

The embodiment of the present application provides an optical film, which can change the optical path of part of the light, thereby weakening the phenomenon of light and dark stripes and moiré patterns caused by the periodic microstructure of the display screen.

The embodiment of the present application provides an optical film, including: a substrate; and microstructures for changing the optical path of part of the light, the microstructures are disposed on the substrate, wherein the microstructure includes first line segment portions and second line segment portions, and wherein in an extension direction of the microstructure, the first line segment portions and the second line segment portions are alternately arranged and connected to each other, and an extending direction of the first line segment portions intersects with an extending direction of the second line segment portions.

Optionally, in some embodiments of the present application, the optical film further includes a transparent layer disposed on the substrate and covers the microstructure, wherein a refractive index of the transparent layer is different from a refractive index of the microstructure.

Optionally, in some embodiments of the present application, the optical film further includes a transparent layer disposed on the substrate, wherein a thickness of the transparent layer is less than a thickness of the microstructure, and a refractive index of the transparent layer is different from a refractive index of the microstructure.

Optionally, in some embodiments of the present application, the refractive index of the transparent layer is greater than the refractive index of the microstructure.

Optionally, in some embodiments of the present application, the optical film further includes a transparent layer, wherein the transparent layer includes a first transparent layer and a second transparent layer, the first transparent layer is disposed on the substrate, a thickness of the first transparent layer is less than a thickness of the microstructure, and the second transparent layer is disposed on the first transparent layer, and wherein a thickness of the transparent layer is greater than a thickness of the microstructure, and a refractive index of the first transparent layer is different from a refractive index of the second transparent layer.

Optionally, in some embodiments of the present application, a refractive index of the microstructure is less than the refractive index of the first transparent layer, and the refractive index of the first transparent layer is less than the refractive index of the second transparent layer.

Optionally, in some embodiments of the present application, a refractive index of the microstructure is equal to a refractive index of the substrate.

Optionally, in some embodiments of the present application, a length of the first line segment portion and a length of the second line segment portion are not equal.

Optionally, in some embodiments of the present application, the included angle is formed between the first line segment portion and the second line segment portion, and adjacent included angles of the same microstructure have different degrees.

The embodiment of the present application further provides another optical film, including: a substrate; microstructures disposed on the substrate, wherein one of the microstructures comprises first line segment portions and second line segment portions, and wherein in an extension direction of the microstructure, the first line segment portions and the second line segment portions are alternately arranged and connected to each other, and an extending direction of the first line segment portions intersects with an extending direction of the second line segment portions; and a transparent layer disposed on the substrate and covers the microstructure, wherein a refractive index of the transparent layer is different from a refractive index of the microstructure, and a thickness of the transparent layer is less than a thickness of the microstructure.

Optionally, in some embodiments of the present application, the refractive index of the transparent layer is greater than the refractive index of the microstructure.

Optionally, in some embodiments of the present application, the transparent layer includes a first transparent layer and a second transparent layer, the first transparent layer is disposed on the substrate, a thickness of the first transparent layer is less than a thickness of the microstructure, and the second transparent layer is disposed on the first transparent layer, and wherein a thickness of the transparent layer is greater than a thickness of the microstructure, and a refractive index of the first transparent layer is different from a refractive index of the second transparent layer.

Optionally, in some embodiments of the present application, the refractive index of the microstructure is less than the refractive index of the first transparent layer, and the refractive index of the first transparent layer is less than the refractive index of the second transparent layer.

Optionally, in some embodiments of the present application, the refractive index of the microstructure is equal to a refractive index of the substrate.

Optionally, in some embodiments of the present application, a length of one of the first line segment portions and a length of one of the second line segment portions are not equal.

Optionally, in some embodiments of the present application, each of the first line segment portions and a corresponding one of the second line segment portions intersect to form included angles, and degrees of adjacent included angles of a same microstructure are not equal.

Correspondingly, an embodiment of the present application further provides a display, including a display panel and the optical film, and the optical film is disposed on the display panel.

Optionally, in some embodiments of the present application, the refractive index of the transparent layer is greater than the refractive index of the microstructure.

Optionally, in some embodiments of the present application, the refractive index of the microstructure is equal to a refractive index of the substrate.

Optionally, in some embodiments of the present application, a length of one of the first line segment portions and a length of one of the second line segment portions are not equal.

Advantages

The embodiments of the present application adopt an optical film, which can change the optical path of part of the light, thereby weakening the phenomenon of light and dark stripes and moiré patterns caused by the periodic microstructure of the display screen.

DESCRIPTION OF DRAWINGS

In order to clearly illustrate the technical solutions in the embodiments of the present application, the following briefly introduces the drawings that need to be used in the description of the embodiments. Obviously, the drawings in the description are only some embodiments of the present application, and for one skill in the art, other drawings can also be obtained from these drawings without paying creative effort.

Figure 1:
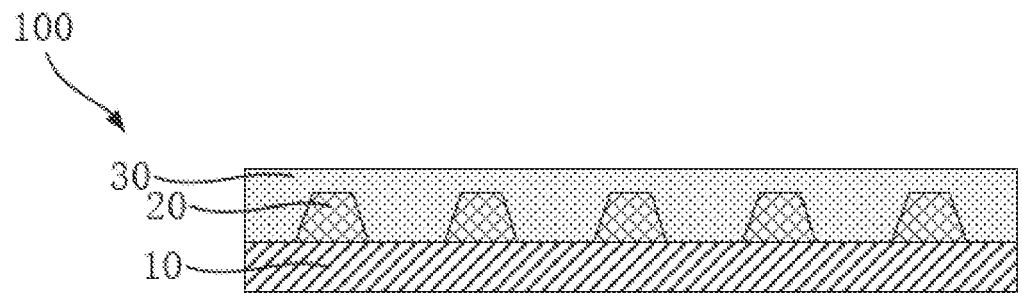
FIG. 1 is a schematic structural diagram of an optical film provided in a first embodiment of the present application.

REFERENCE NUMERALS optical film 100, substrate 10, microstructure 20, transparent layer 30, first line segment portion 21, second line segment portion 22, first transparent layer 31, second transparent layer 32, display 200, display panel 210.

DETAILED DESCRIPTION OF PREFERRED EMBODIMENTS

The technical solutions in the embodiments of the present application will be clearly described with reference to the drawings in the embodiments of the present application. Obviously, the embodiments are only part of the embodiments of the present application, but not all the embodiments. Based on these embodiments in this application, all other embodiments obtained by one skill in the art without paying creative efforts shall fall within the protection scope of this application. In addition, the specific embodiments described herein are only used to illustrate and explain the present application, but not to limit the present application. In this application, unless otherwise stated, the use of directional words such as "upper" and "lower" generally refers to the upper and lower parts of the device in actual use or working state. Specifically, the orientation in the drawings, whereas "inside" and "outside" refer to the outline of the device.

Embodiments of the present application provide a display panel, which will be described in detail later. It should be noted that the description order of the following embodiments is not intended to limit the preferred order of the embodiments.

First Embodiment

Figure 2:
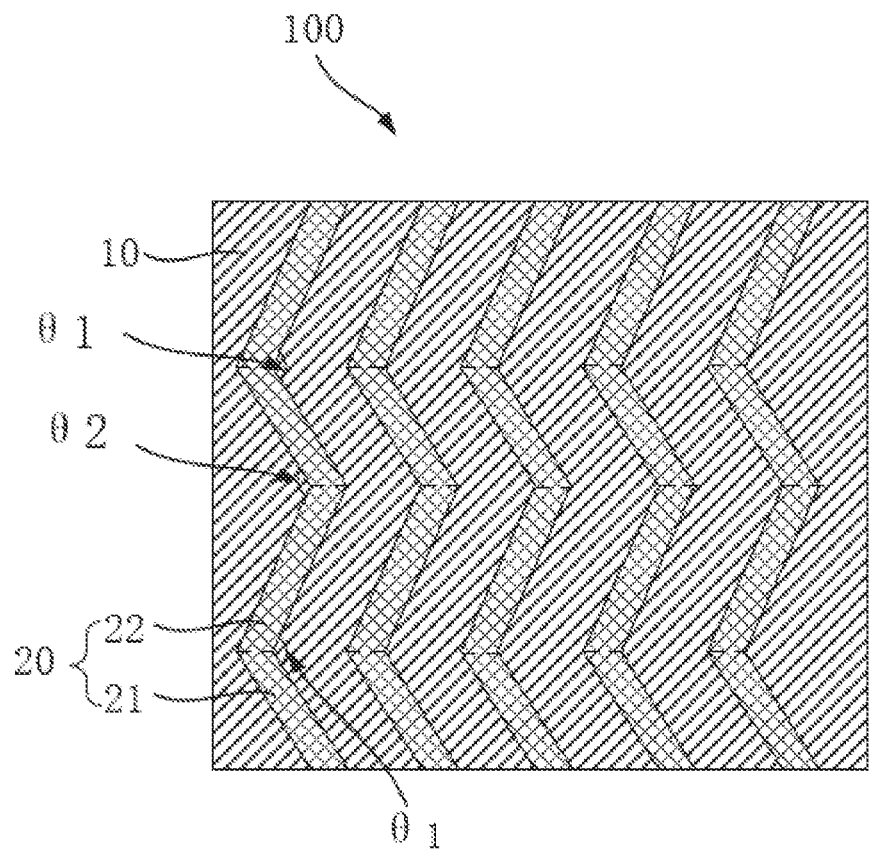
FIG. 2 is a top-view structural schematic diagram of the optical film provided by the first embodiment of the present application.

Please refer to FIG. 1 and FIG. 2, the optical film 100 includes a substrate 10 and a plurality of microstructures 20, and the microstructures 20 are disposed on the substrate 10. A microstructure 20 includes a plurality of first line segment portions 21 and a plurality of second line segment portions 22. In the extending direction of the microstructure 20, the first line segment portions 21 and the second line segment portions 22 are alternately arranged, and the first line segment portions 21 and the second line segment portions 22 are connected. The extension direction of the first line segment portions intersects with the extension direction of the second line segment portions.

It can be understood that, in this embodiment, the microstructures 20 disposed on the substrate 10 are used to change the optical path of part of the light of the display screen, thereby weakening the phenomenon of light and dark stripes and moiré patterns caused by the periodic microstructures 20 of the display screen. It should be noted that when light enters the microstructure 20, there is an included angle between a part of the microstructure and the light and the optical path of part of the light changes at this time. Part of the light is vertically incident, so its light path will not change, so microstructures can be used to change the characteristics of the light path of part of the light to destroy the periodicity of the light.

It should be noted that the dotted line between the first line segment portion and the second line segment portion in the microstructure is only an example for the convenience of description, and is not a solution for limiting the microstructure. In fact, the first line segment portion and the second line segment portion of the microstructure may be integrally provided or non-integrally provided, which is not limited herein.

It should be noted that the extension direction can be understood as the extension direction of the microstructure, not just a certain linear direction, but should be understood as an extension trend of the microstructure. It should be noted that when the first line segment portion and the second line segment portion are straight, the extension direction of the first line segment portion and the second line segment portion should be understood as the busbar direction. When the first line segment portion and the second line segment portion are in the form of a polyline, the extension direction of the first line segment portion and the second line segment portion should be understood as their trend.

Figure 3:
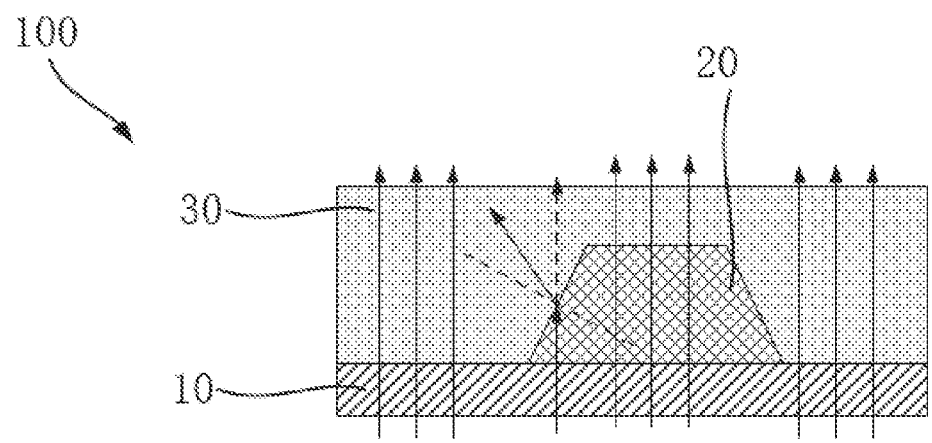
FIG. 3 is a schematic diagram of an optical path on the microstructure when the optical film provided by the first embodiment of the present application is normally placed.

Please refer to FIG. 3, in this embodiment, the optical film 100 further includes a transparent layer 30. The transparent layer 30 is disposed on the substrate 10 and covers the microstructures 20, and the refractive index of the transparent layer 30 is different from that of the microstructures 20.

It can be understood that, in this embodiment, the arrangement of the transparent layer 30 can further refract the light by utilizing the refraction principle of light, thereby destroying the periodicity of the original light.

In this embodiment, the refractive index of the transparent layer 30 is greater than the refractive index of the microstructure 20.

Figure 4:
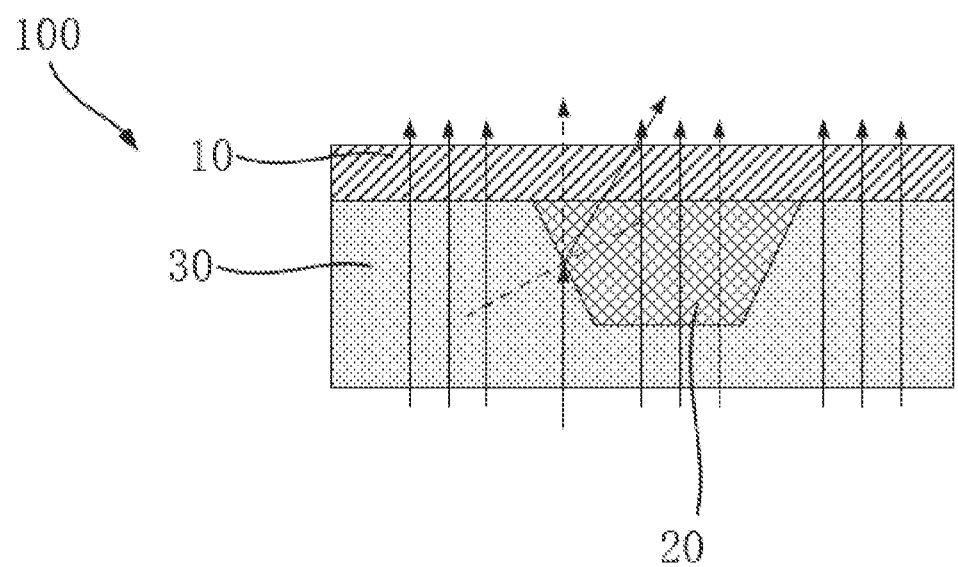
FIG. 4 is a schematic diagram of an optical path on the microstructure when the optical film provided by the first embodiment of the present application is placed upside down.

It can be understood that, in this embodiment, by setting the refractive index of the transparent layer 30 to be greater than the refractive index of the microstructure 20, the viewing angle of the display screen can be increased or decreased. Please refer to FIG. 3, it should be noted that, in this embodiment, when substrate 10 is used as the light incident surface, it is defined that the optical film 100 is placed with the front side facing up. Please refer to FIG. 4, when substrate 10 is used as the light emitting surface, the optical film 100 is defined as being placed upside down. When the optical film 100 is placed face up on the display screen, it can be used to increase the viewing angles of the display screen, and when the optical film 100 is placed upside down on the display screen, it can be used to reduce the viewing angles of the display screen, which is applicable to different requirements.

In this embodiment, the refractive index of the microstructure 20 is equal to the refractive index of the substrate 10.

It can be understood that, in this embodiment, by setting the refractive indices of the microstructure 20 and the substrate 10 to be equal, that is, the optical path of the light in the microstructure 20 and the substrate 10 is unchanged so it is convenient for the personnel to control the proportion of the light whose optical path needs to be changed. Because in this embodiment, the periodicity of the light is destroyed by changing the optical path of part of the light.

It should be noted that, in the present embodiment, the shapes of the first line segment portion 21 and the second line segment portion 22 are pyramid-shaped. In fact, the shapes of the first line segment portion 21 and the second line segment portion 22 are not limited thereto, and may also include cylinders, prisms, pyramids, or the like. It should be noted that, in some embodiments, the shapes of the first line segment portion 21 and the second line segment portion 22 may be different. For example, the first line segment portion 21 is truncated, and the second line segment portion 22 is cylindrical, or any combination thereof. This design can further destroy the periodicity of the microstructure, which further destroys the periodicity of the light.

It should be noted that, in this embodiment, the microstructure 20 may be formed by a photolithography process, and the transparent layer 30 may be formed by a coating process. The material of the microstructure 20 may be the same as the material of the substrate 10.

In this embodiment, the length of the first line segment portion 21 and the length of the second line segment portion 22 are not equal.

Figure 5:
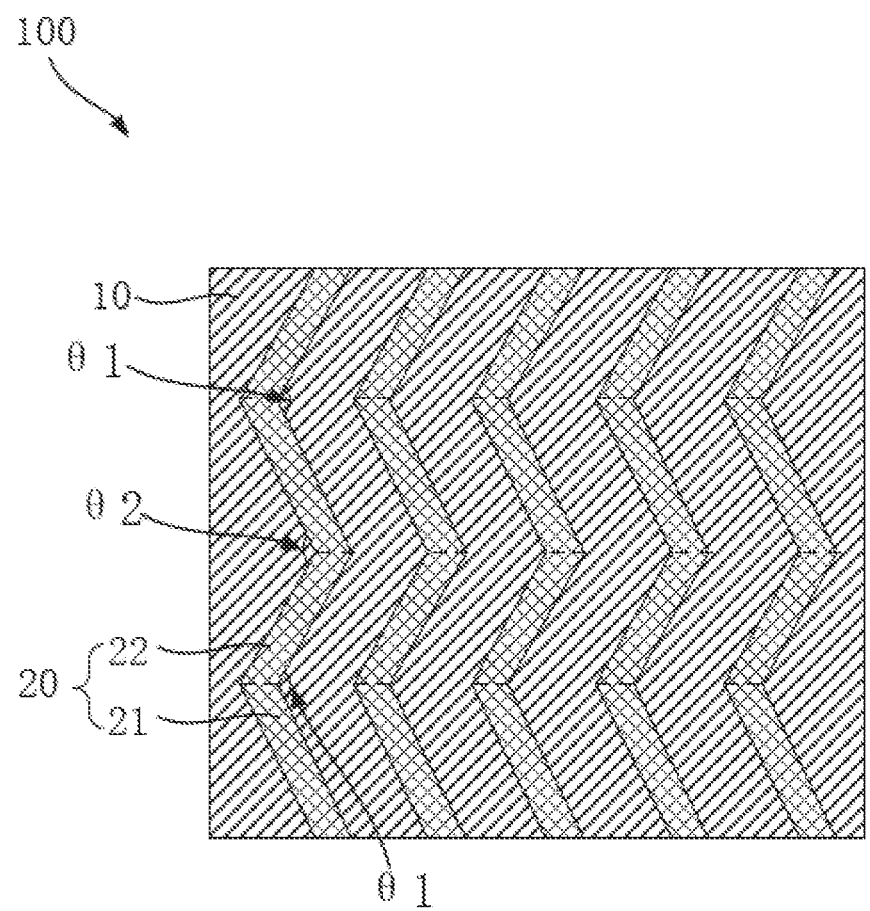
FIG. 5 is a schematic top-view structural diagram of the optical film provided in some embodiments provided by the first embodiment of the present application.

It can be understood that, by setting the lengths of the first line segment portion 21 and the second line segment portion 22 to be different, the periodicity of the microstructure 20 can be further destroyed. This further destroys the periodicity of the light to better weaken the phenomenon of moiré patterns or light and dark stripes. Please refer to FIG. 5, in some embodiments, in order to simplify the manufacturing process of the microstructure 20, the length of the first line segment portion 21 and the length of the second line segment portion 22 are equal. The length range of the first line segment portion 21 is greater than 0 meters and less than or equal to 5 meters, such as meters, 2.5 meters, or 5 meters, and the length range of the second line segment portion 22 is greater than 0 meters and less than or equal to 5 meters, such as 0.001 meters, 2.5 meters, or 5 meters.

In this embodiment, there is an included angle between the first line segment portion 21 and the second line segment portion 22, and the degrees of adjacent included angles located on the same microstructure are not equal.

As shown in FIG. 2, the included angle between the first line segment portion 21 and the second line segment portion 22 connected thereto is θ1, and the included angle between the second line segment portion 22 and the next first line segment portion 21 connected thereto is θ2. By setting the first line segment portion 21 and the second line segment portion 22 to have an included angle and the degrees of the adjacent included angles are not equal (that is, the degrees of θ1 and θ2 are not equal), the periodicity of the microstructure 20 can be destroyed, thereby destroying the periodicity of the light to achieve a better effect of weakening the phenomenon of moiré patterns or light and dark stripes. It should be noted that the degrees of the included angle are greater than 0 degrees and less than 180 degrees, such as 1°, 90°, or 179°. Please refer to FIG. 5, in some embodiments, for the sake of simplifying the manufacturing process of the microstructure 20, there is an included angle between the first line segment 21 and the second line segment 22, and the adjacent included angles have equal degrees.

The thickness of the microstructures 20 is greater than 0 microns and less than or equal to 100 microns, such as 0.01 microns, 50 microns, or 100 microns. The thickness of the transparent layer 30 is greater than 0 micrometers and less than or equal to 100 micrometers, such as 0.01 micrometers, 50 micrometers, or 100 micrometers.

It can be understood that, when the first line segment portion and the second line segment portion are in the shape of a pyramid, the thickness of the microstructure refers to the distance between the upper edge of the pyramid and the substrate. When the first line segment portion and the second line segment portion are triangular, the thickness of the microstructure refers to the distance between the vertex of the triangle and the substrate. When the first line segment portion and the second line segment portion are cylindrical, the thickness of the microstructure refers to the maximum distance between the side surface of the cylinder and the substrate.

Second Embodiment

Figure 6:
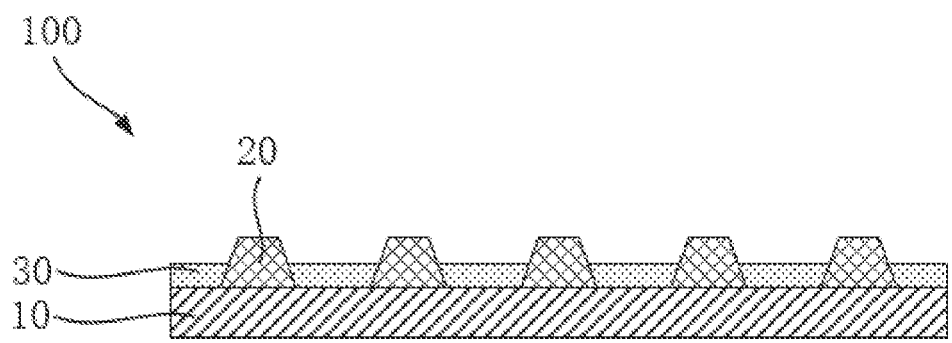
FIG. 6 is a schematic structural diagram of an optical film provided by a second embodiment of the present application.

Please refer to FIG. 2 and FIG. 6, the optical film 100 includes a substrate 10 and microstructures 20, wherein the microstructures 20 are disposed on the substrate 10. The microstructure 20 includes a plurality of first line segment portions 21 and a plurality of second line segment portions 22. In the extending direction of the microstructure 20, the first line segment portions 21 and the second line segment portions 22 are alternately arranged, and the first line segment portions 21 and the second line segment portions 22 are connected. The extending direction of the first line segment portion intersects with the extending direction of the second line segment portion.

It can be understood that, in this embodiment, the microstructures 20 disposed on the substrate 10 are used to change the optical path of part of the light from the display screen, thereby weakening the phenomenon of light and dark stripes and moiré patterns caused by the periodic microstructures 20 of the display screen. It should be noted that when the light enters the microstructure 20, a part of the structure of the microstructure 20 forms an included angle with the light, at this moment, the optical path of part of the light changes, and part of the light are incident vertically, so the optical path does not change. Therefore, the microstructure can be used to change the characteristics of the optical path of part of the light to destroy the periodicity of the light.

It should be noted that the dotted line between the first line segment portion and the second line segment portion in the microstructure is only an example for the convenience of description, and is not a solution for limiting the microstructure. In fact, the first line segment portion and the second line segment portion of the microstructure may be integrally provided or non-integrally provided, which is not limited herein.

It should be noted that the extension direction can be understood as the extension direction of the microstructure, not just a certain linear direction, but should be understood as an extension trend of the microstructure. It should be noted that when the first line segment portion and the second line segment portion are straight, the extension direction of the first line segment portion and the second line segment portion should be understood as the busbar direction. When the first line segment portion and the second line segment portion are in the form of a polyline, the extension direction of the first line segment portion and the second line segment portion should be understood as their trend.

Figure 7:
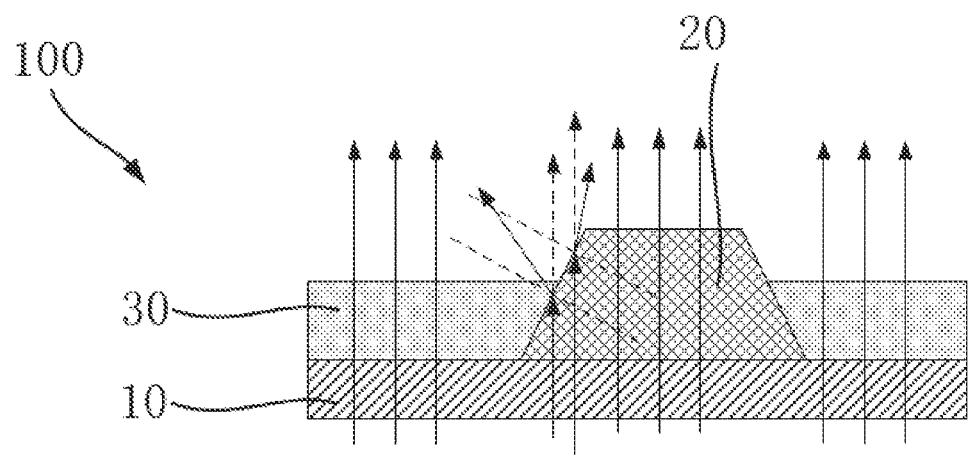
FIG. 7 is a schematic diagram of an optical path on the microstructure of the optical film provided by the second embodiment of the present application.

Please refer to FIG. 7, in this embodiment, the optical film 100 further includes a transparent layer 30, and the transparent layer 30 is disposed on the substrate 10. The thickness of the transparent layer 30 is less than the thickness of the microstructures 20, and the refractive index of the transparent layer 30 is different from that of the microstructures 20.

It can be understood that, in this embodiment, the transparent layer 30 is arranged to refract the light by utilizing the refraction principle of light, thereby destroying the periodicity of the original light. It should be noted that, in this embodiment, by setting the thickness of the transparent layer 30 to be less than the thickness of the microstructure 20, the refraction of light from the microstructure 20 to the air can be realized. This further improves the complexity of the optical path, thereby enhancing the effect of destroying the periodicity of light on the display screen. It should be noted that the thickness of the transparent layer 30 and the thickness of the microstructure 20 are both the heights protruding from the substrate 10.

In this embodiment, the refractive index of the transparent layer 30 is greater than the refractive index of the microstructure 20.

It can be understood that, in this embodiment, by setting the refractive index of the transparent layer 30 to be greater than the refractive index of the microstructure the viewing angles of the display screen can be increased or decreased. It should be noted that, in this embodiment, when substrate 10 is used as the light incident surface, it is defined that the optical film 100 is placed with the front side facing up, and when substrate 10 is used as the light emitting surface, the optical film 100 is defined as being placed upside down. When the optical film 100 is placed face up on the display screen, it can be used to increase the viewing angles of the display screen, and when the optical film 100 is placed upside down on the display screen, it can be used to reduce the viewing angles of the display screen, which is applicable to different requirements.

In this embodiment, the refractive index of the microstructure 20 is equal to the refractive index of the substrate 10.

It can be understood that, in this embodiment, by setting the refractive indices of the microstructure 20 and the substrate 10 to be equal, that is, the optical path of the light in the microstructure 20 and the substrate 10 is unchanged so it is convenient for the personnel to control the proportion of the light whose optical path needs to be changed. In this embodiment, the periodicity of the light is destroyed by changing the optical path of part of the light.

It should be noted that, in the present embodiment, the shape of the microstructure 20 is a prismatic shape. In fact, the shape of the microstructure 20 is not limited to this, and can also be a cylinder, a prism, a pyramid, or the like. It should be noted that, in some embodiments, the shapes of the first line segment portion 21 and the second line segment portion 22 may be different. For example, the first line segment portion 21 is a prismatic shape, and the second line segment portion 22 is a cylindrical shape, or any combination thereof. This design can further destroy the periodicity of the microstructure, which further destroys the periodicity of the light.

It should be noted that, in this embodiment, the microstructure 20 may be formed by a photolithography process, and the transparent layer 30 may be formed by a coating process. The material of the microstructure 20 may be the same as the material of the substrate 10.

In this embodiment, the length of the first line segment portion 21 and the length of the second line segment portion 22 are not equal.

It can be understood that, by setting the lengths of the first line segment portion 21 and the second line segment portion 22 to be different, the periodicity of the microstructure 20 can be further destroyed. This further destroys the periodicity of the light to better weaken the phenomenon of moiré patterns or light and dark stripes. In some embodiments, in order to simplify the manufacturing process of the microstructure 20, the length of the first line segment portion 21 and the length of the second line segment portion 22 are equal. The length range of the first line segment portion 21 is greater than 0 meters and less than or equal to 5 meters, such as 0.001 meters, 2.5 meters, or 5 meters, and the length range of the second line segment portion 22 is greater than 0 meters and less than or equal to 5 meters, such as 0.001 meters, 2.5 meters, or 5 meters.

In this embodiment, there is an included angle between the first line segment portion 21 and the second line segment portion 22, and the degrees of adjacent included angles located on the same microstructure are not equal.

It can be understood that the included angle between the first line segment portion 21 and the second line segment portion 22 connected thereto is θ1, and the included angle between the second line segment portion 22 and the next first line segment portion 21 connected thereto is θ2. By setting the first line segment portion 21 and the second line segment portion 22 to have an included angle and the degrees of the adjacent included angles are not equal (that is, the degrees of θ1 and θ2 are not equal), the periodicity of the microstructure 20 can be destroyed, thereby destroying the periodicity of the light to achieve a better effect of weakening the phenomenon of moiré patterns or light and dark stripes. It should be noted that the degree of the included angle is greater than 0 degrees and less than 180 degrees, such as 1°, 90°, or 179°. In some embodiments, for the sake of simplifying the manufacturing process of the microstructure 20, there is an included angle between the first line segment 21 and the second line segment 22, and the adjacent included angles have equal degrees.

The thickness of the microstructures 20 is greater than 0 microns and less than or equal to 100 microns, such as 0.01 microns, 50 microns, or 100 microns. The thickness of the transparent layer 30 is greater than 0 micrometers and less than or equal to 100 micrometers, such as 0.01 micrometers, 50 micrometers, or 100 micrometers.

It can be understood that, when the first line segment portion and the second line segment portion are in the shape of a pyramid, the thickness of the microstructure refers to the distance between the upper edge of the pyramid and the substrate, when the first line segment portion and the second line segment portion are triangular, the thickness of the microstructure refers to the distance between the vertex of the triangle and the substrate, and when the first line segment portion and the second line segment portion are cylindrical, the thickness of the microstructure refers to the maximum distance between the side surface of the cylinder and the substrate.

Third Embodiment

Figure 8:
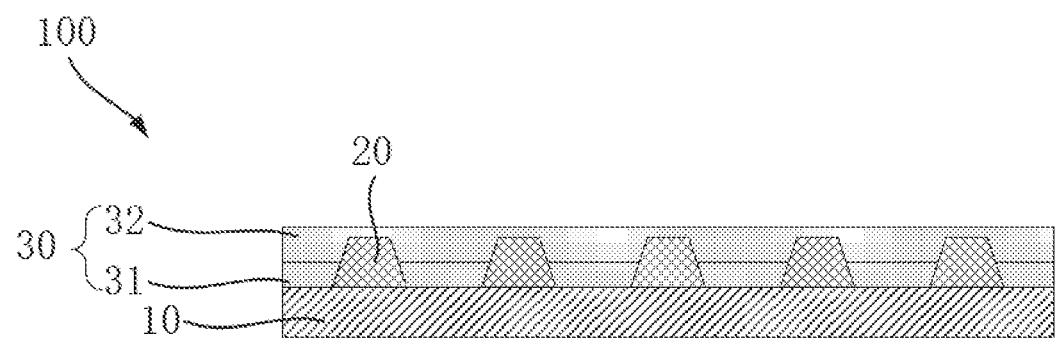
FIG. 8 is a schematic structural diagram of an optical film provided by a third embodiment of the present application.

Please refer to FIG. 2 and FIG. 8, an optical film 100, including a substrate and microstructures 20, wherein the microstructures 20 are disposed on the substrate 10. The microstructure 20 includes a plurality of first line segment portions 21 and a plurality of second line segment portions 22. In the extending direction of the microstructure 20, the first line segment portions 21 and the second line segment portions 22 are alternately arranged, and the first line segment portions 21 and the second line segment portions 22 are connected. The extending direction of the first line segment portion intersects with the extending direction of the second line segment portion.

It can be understood that, in this embodiment, the microstructures 20 disposed on the substrate 10 are used to change the optical path of part of the light from the display screen, thereby weakening the phenomenon of light and dark stripes and moiré patterns caused by the periodic microstructures 20 of the display screen. It should be noted that when the light enters microstructure 20, a part of the structure of the microstructure 20 forms an included angle with the light, at this moment, the optical path of part of the light changes, and part of the light are incident vertically, so their optical path does not change. Therefore, the microstructure can be used to change the characteristics of the optical path of part of the light to destroy the periodicity of the light.

It should be noted that the dotted line between the first line segment portion and the second line segment portion in the microstructure is only an example for the convenience of description, and is not a solution for limiting the microstructure. In fact, the first line segment portion and the second line segment portion of the microstructure may be integrally provided or non-integrally provided, which is not limited herein.

It should be noted that the extension direction can be understood as the extension direction of the microstructure, not just a certain linear direction, but should be understood as an extension trend of the microstructure. It should be noted that when the first line segment portion and the second line segment portion are straight, the extension direction of the first line segment portion and the second line segment portion should be understood as the busbar direction. When the first line segment portion and the second line segment portion are in the form of a polyline, the extension direction of the first line segment portion and the second line segment portion should be understood as their trend.

Figure 9:
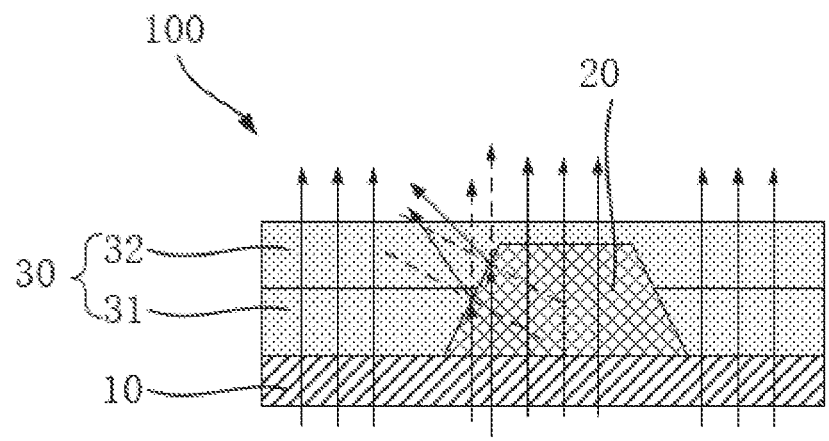
FIG. 9 is a schematic diagram of an optical path on the microstructure of the optical film provided by the third embodiment of the present application.

Please refer to FIG. 9, in this embodiment, the optical film 100 further includes a transparent layer 30. The transparent layer 30 includes a first transparent layer 31 and a second transparent layer 32, wherein the first transparent layer 31 is disposed on the substrate 10 and the thickness of the first transparent layer 31 is less than the thickness of the microstructure 20. The second transparent layer 32 is disposed on the first transparent layer 31, the thickness of the transparent layer 30 is greater than the thickness of the microstructure 20, and the refractive index of the first transparent layer 31 and the refractive index of the second transparent layer 32 are different.

It can be understood that, in this embodiment, by arranging the first transparent layer 31 and the second transparent layer 32, when the light enters the transparent layer 30 from the microstructure 20, it will have different refraction paths, which increases the complexity of the light path. It is beneficial to weaken the phenomenon of moiré patterns or the light and dark stripes. In some embodiments, the transparent layer 30 can be a multi-layer structure, including three or more layers.

In this embodiment, the refractive index of the microstructure 20 is less than the refractive index of the first transparent layer 31, and the refractive index of the first transparent layer 31 is less than the refractive index of the second transparent layer 32.

It can be understood that, in this embodiment, the refractive index of the first transparent layer 31 is less than the refractive index of the second transparent layer 32 not only conducive to improving the complexity of the optical path but also conducive to weakening the phenomenon of moiré patterns or light and dark fringes. This can also achieve the purpose of increasing or decreasing the viewing angles of the display screen. In some embodiments, the transparent layer 30 can be a multi-layer structure including three or more layers, and the refractive index of the transparent layer 30 increases in the thickness direction.

In this embodiment, the refractive index of the transparent layer 30 is greater than the refractive index of the microstructure 20.

It can be understood that, in this embodiment, by setting the refractive index of the transparent layer 30 to be greater than the refractive index of the microstructure 20, the viewing angles of the display screen can be increased or decreased. It should be noted that, in this embodiment, when substrate 10 is used as the light incident surface, it is defined that the optical film 100 is placed with the front side facing up, and when substrate 10 is used as the light emitting surface, the optical film 100 is defined as being placed upside down. When the optical film 100 is placed face up on the display screen, it can be used to increase the viewing angles of the display screen, and when the optical film 100 is placed upside down on the display screen, it can be used to reduce the viewing angles of the display screen, which is applicable to different requirements.

In this embodiment, the refractive index of the microstructure 20 is equal to the refractive index of the substrate 10.

It can be understood that, in this embodiment, by setting the refractive indices of the microstructure 20 and the substrate 10 to be equal, that is, the optical path of light in the microstructure 20 and the substrate 10 is unchanged so it is convenient for the personnel to control the proportion of the light whose optical path needs to be changed. In this embodiment, the periodicity of the light is destroyed by changing the optical path of part of the light.

It should be noted that, in the present embodiment, the shape of the microstructure 20 is a prismatic shape. In fact, the shape of the microstructure 20 is not limited to this, and can also be a cylinder, a prism, a pyramid, or the like. It should be noted that, in some embodiments, the shapes of the first line segment portion 21 and the second line segment portion 22 may be different. For example, the first line segment portion 21 is a prismatic shape, and the second line segment portion 22 is a cylindrical shape, or any combination thereof. This design can further destroy the periodicity of the microstructure, which further destroys the periodicity of the light.

It should be noted that, in this embodiment, the microstructure 20 may be formed by a photolithography process, and the transparent layer 30 may be formed by a coating process. The material of the microstructure 20 may be the same as the material of the substrate 10.

In this embodiment, the length of the first line segment portion 21 and the length of the second line segment portion 22 are not equal.

It can be understood that, by setting the lengths of the first line segment portion 21 and the second line segment portion 22 to be different, the periodicity of the microstructure 20 can be further destroyed. This further destroys the periodicity of the light to better weaken the phenomenon of moiré patterns or light and dark stripes. In some embodiments, in order to simplify the manufacturing process of the microstructure 20, the length of the first line segment portion 21 and the length of the second line segment portion 22 are equal. The length range of the first line segment portion 21 is greater than 0 meters and less than or equal to 5 meters, such as 0.001 meters, 2.5 meters, or 5 meters, and the length range of the second line segment portion 22 is greater than 0 meters and less than or equal to 5 meters, such as 0.001 meters, 2.5 meters, or 5 meters.

In this embodiment, there is an included angle between the first line segment portion 21 and the second line segment portion 22, and the degrees of adjacent included angles located on the same microstructure are not equal.

It can be understood that the included angle between the first line segment portion 21 and the second line segment portion 22 connected thereto is $\theta 1$, and the included angle between the second line segment portion 22 and the next first line segment portion 21 connected thereto is $\theta 2$. By setting the first line segment portion 21 and the second line segment portion 22 to have an included angle and the degrees of the adjacent included angles are not equal (that is, the degrees of $\theta 1$ and $\theta 2$ are not equal), the periodicity of the microstructure 20 can be destroyed, thereby destroying the periodicity of the light to achieve a better effect of weakening the phenomenon of moiré patterns or light and dark stripes. It should be noted that the degree of the included angle is greater than 0 degrees and less than 180 degrees, such as 1°, 90°, or 179°. In some embodiments, for the sake of simplifying the manufacturing process of the microstructure 20, there is an included angle between the first line segment 21 and the second line segment 22, and the adjacent included angles have equal degrees.

The thickness of the microstructures 20 is greater than 0 microns and less than or equal to 100 microns, such as 0.01 microns, 50 microns, or 100 microns. The thickness of the transparent layer 30 is greater than 0 micrometers and less than or equal to 100 micrometers, such as 0.01 micrometers, 50 micrometers, or 100 micrometers.

It can be understood that, when the first line segment portion and the second line segment portion are in the shape of a pyramid, the thickness of the microstructure refers to the distance between the upper edge of the pyramid and the substrate, when the first line segment portion and the second line segment portion are triangular, the thickness of the microstructure refers to the distance between the vertex of the triangle and the substrate, and when the first line segment portion and the second line segment portion are cylindrical, the thickness of the microstructure refers to the maximum distance between the side surface of the cylinder and the substrate.

Fourth Embodiment

Figure 10:
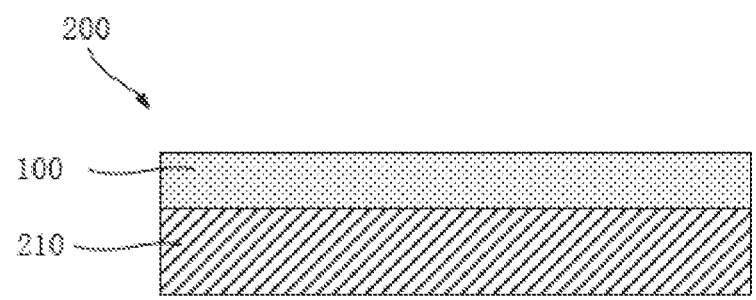
FIG. 10 is a schematic structural diagram of a display provided by a fourth embodiment of the present application.

Please refer to FIG. 10, this embodiment provides a display 200. The display 200 includes a display panel 210 and the optical film 100 described in any one of the first embodiment, the second embodiment, or the third embodiment, and the optical film 100 is disposed on the display panel 210.

It can be understood that, in this embodiment, the optical film 100 described in any one of the first embodiment, the second embodiment, or the third embodiment is adopted. This can change the optical path of part of the light of the display 200, thereby weakening the phenomenon of light and dark stripes or moiré patterns caused by the periodic microstructures 20 of the display 200 and changing the viewing angles of the display 200.

The optical film and the display provided by the embodiments of the present application have been described in detail above, and the principles and implementations of the present application are described with specific embodiments. The descriptions of the embodiments are only used to help understand the method of the present application and its core idea. Meanwhile, for one skill in the art, according to the idea of the present application, there will be changes in the specific embodiments and the scope of application. In conclusion, the content of this specification should not be construed as a limitation on the present application.

What is claimed is:

1. An optical film, comprising:
 a substrate;
 microstructures disposed on the substrate, wherein one of the microstructures comprises first line segment portions and second line segment portions, and wherein in an extension direction of the microstructure, the first line segment portions and the second line segment portions are alternately arranged and connected to each other, and an extending direction of the first line segment portions intersects with an extending direction of the second line segment portions; and a transparent layer, wherein the transparent layer comprises a first transparent layer and a second transparent layer, the first transparent layer is disposed on the substrate, a thickness of the first transparent layer is less than a thickness of the microstructure to expose a top surface of the microstructure and a part of side surfaces of the microstructure, the second transparent layer is disposed on the first transparent layer, and a thickness of the second transparent layer is greater than a thickness of the microstructure to cover the top surface of the microstructure and the part of side surfaces of the microstructure.

2. The optical film of claim 1, wherein a refractive index of the transparent layer is different from a refractive index of the microstructure.

3. The optical film of claim 2, wherein the refractive index of the transparent layer is greater than the refractive index of the microstructure.

4. The optical film of claim 1, a refractive index of the first transparent layer is different from a refractive index of the second transparent layer.

5. The optical film of claim 4, wherein a refractive index of the microstructure is less than the refractive index of the first transparent layer, and the refractive index of the first transparent layer is less than the refractive index of the second transparent layer.

6. The optical film of claim 1, wherein a refractive index of the microstructure is equal to a refractive index of the substrate.

7. The optical film of claim 1, wherein a length of one of the first line segment portions and a length of one of the second line segment portions are not equal.

8. The optical film of claim 1, wherein each of the first line segment portions and a corresponding one of the second line segment portions intersect to form included angles, and degrees of adjacent included angles of a same microstructure are not equal.

9. An optical film, comprising:
a substrate;
microstructures disposed on the substrate, wherein one of the microstructures comprises first line segment portions and second line segment portions, and wherein in an extension direction of the microstructure, the first line segment portions and the second line segment portions are alternately arranged and connected to each other, and an extending direction of the first line segment portions intersects with an extending direction of the second line segment portions; and a transparent layer disposed on the substrate and covers the microstructure, wherein a refractive index of the transparent layer is different from a refractive index of the microstructure;

wherein the transparent layer comprises a first transparent layer and a second transparent layer, the first transparent layer is disposed on the substrate, a thickness of the first transparent layer is less than a thickness of the microstructure to expose a top surface of the microstructure and a part of side surfaces of the microstructure, the second transparent layer is disposed on the first transparent layer, and a thickness of the second transparent layer is greater than a thickness of the microstructure to cover the top surface of the microstructure and the part of side surfaces of the microstructure.

10. The optical film of claim 9, wherein the refractive index of the transparent layer is greater than the refractive index of the microstructure.

11. The optical film of claim 9, wherein a refractive index of the second transparent layer.

12. The optical film of claim 11, wherein the refractive index of the microstructure is less than the refractive index of the first transparent layer, and the refractive index of the first transparent layer is less than the refractive index of the second transparent layer.

13. The optical film of claim 9, wherein the refractive index of the microstructure is equal to a refractive index of the substrate.

14. The optical film of claim 9, wherein a length of one of the first line segment portions and a length of one of the second line segment portions are not equal.

15. The optical film of claim 9, wherein each of the first line segment portions and a corresponding one of the second line segment portions intersect to form included angles, and degrees of adjacent included angles of a same microstructure are not equal.

16. A display comprising a display panel and the optical film of claim 9, wherein the optical film is disposed on the display panel.

17. The display of claim 16, wherein the refractive index of the transparent layer is greater than the refractive index of the microstructure.

18. The display of claim 16, wherein the refractive index of the microstructure is equal to a refractive index of the substrate.

19. The display of claim 16, wherein a length of one of the first line segment portions and a length of one of the second line segment portions are not equal.

* * * * *